United States Patent [19]
Pye et al.

[11] 3,993,864
[45] Nov. 23, 1976

[54] TELEVISION CAMERA ARRANGEMENT IN WHICH ELECTRICALLY GENERATED DATA IS SUPERIMPOSED ON THE VIDEO PICTURE INFORMATION

[75] Inventors: Allan Sydney Pye, Southminster; Peter Raymond Digby, Chelmsford, both of England

[73] Assignee: Elliott Brothers (London) Limited, London, England

[22] Filed: July 28, 1975

[21] Appl. No.: 599,550

[30] Foreign Application Priority Data
July 28, 1974 United Kingdom............... 35123/74

[52] U.S. Cl............................. 178/7.1; 178/DIG. 6; 178/DIG. 30; 178/5.8 R
[51] Int. Cl.²...................... H04N 5/38; H04N 5/22
[58] Field of Search............... 178/DIG. 6, 5.6, 7.1, 178/7.2, DIG. 30, 5.8; 340/324 AD

[56] References Cited
UNITED STATES PATENTS

| | | | |
|---|---|---|---|
| 3,528,068 | 9/1970 | Johnson | 340/324 AD |
| 3,786,481 | 1/1974 | Hartman | 178/DIG. 6 |
| 3,812,285 | 3/1974 | Miyata et al. | 340/324 AD |
| 3,836,902 | 9/1974 | Okuda et al. | 340/324 AD |
| 3,891,792 | 6/1975 | Kimura | 178/5.6 |
| 3,898,644 | 8/1975 | Baxter | 178/DIG. 6 |

*Primary Examiner*—John C. Martin
*Attorney, Agent, or Firm*—Baldwin, Wight & Brown

[57] ABSTRACT

A television camera arrangement includes a read only memory for storing character or symbol information in a form which can readily be combined with normal video picture information to produce a composite display. For example a symbol indicating the identity of a camera can be included in its video output.

4 Claims, 1 Drawing Figure

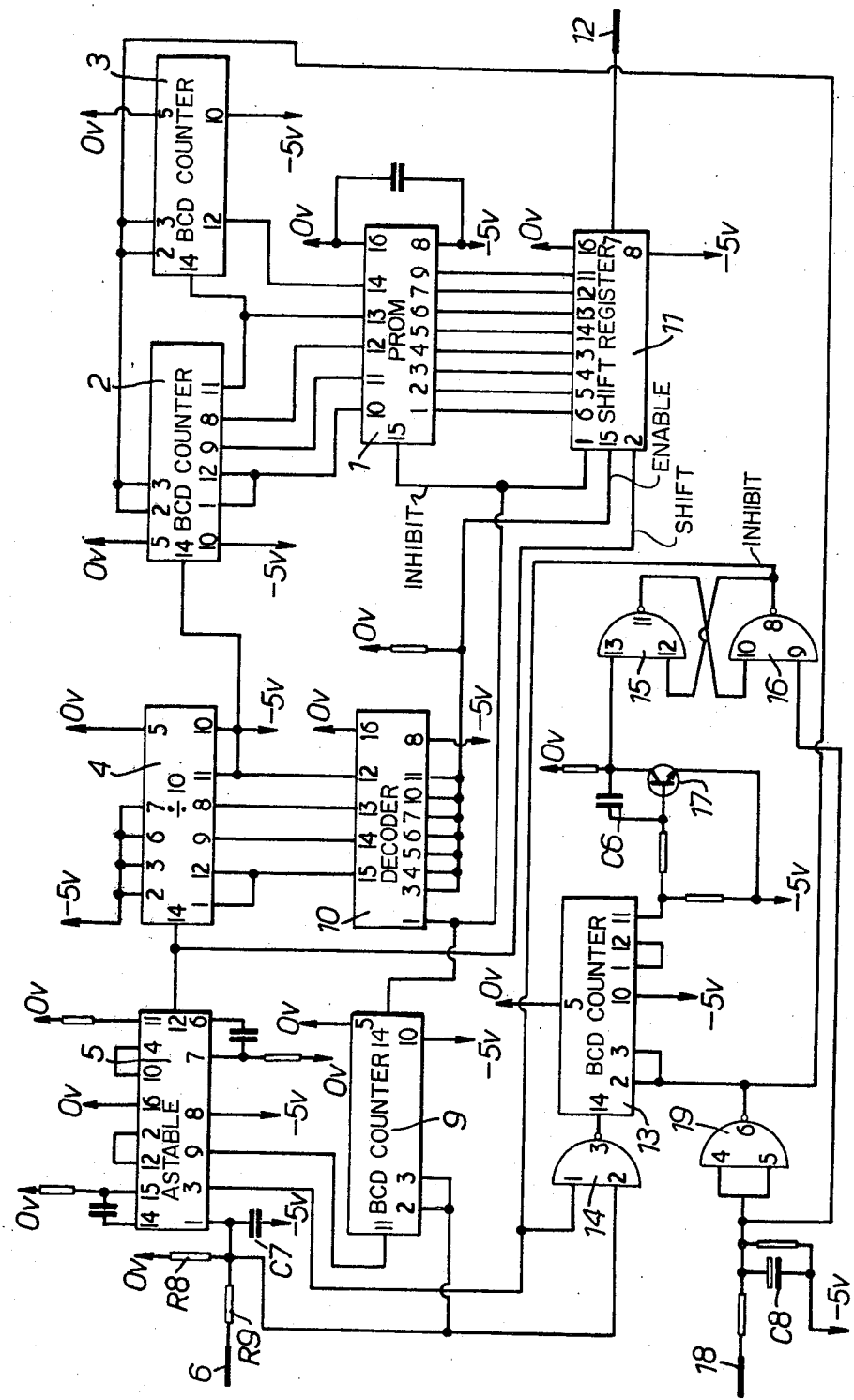

TELEVISION CAMERA ARRANGEMENT IN WHICH ELECTRICALLY GENERATED DATA IS SUPERIMPOSED ON THE VIDEO PICTURE INFORMATION

This invention relates to television cameras. As is well known, it is often required to provide a video signal relating to a scene or object being viewed by a television camera, on which is superimposed character or symbol information so that in a picture reproduced by a television receiving apparatus characters or symbols appear superimposed upon the picture in some desired position, for example in one of the upper corners of the picture. This is the case, for example, where, for monitoring purposes, it is required readily to identify that one of a number of cameras which has provided a particular video signal. In such a case the characters or symbols involved may be those identifying that particular camera.

One way of achieving this is to physically view the characters or symbols required with one television camera to produce a video signal which is then mixed with the video output of a second television camera viewing a scene on which the characters or symbols are required to be superimposed when reproduced by a receiving apparatus. Such methods are unduly complex.

The present invention seeks to provide an improved television camera which, in a relatively simple manner, is capable of providing a video output signal relating not only to a scene being viewed by that camera, but also including symbol or character information required to be presented on a picture reconstructed by a receiving apparatus.

According to this invention a television camera arrangement is provided wherein in order to provide in the video signal output thereof character or symbol information, accommodation is provided for a read only memory programmed in accordance with the character or symbol information required, and said camera arrangement includes synchronised with the video signal timing circuits of the camera, for reading out in video signal form the information with which the read only memory is programmed and means for mixing said last mentioned information with video signal output generated in accordance with a scene being viewed by said camera arrangement.

Normally the accommodation for said read only memory is provided such that a read only memory is readily removable so that any one of a number of read only memories programmed with different character or symbol information may be accommodated in said camera arrangement. Thus, for example, for monitoring purposes a camera arrangement having a given designation corresponding to one read only memory may be given another designation by changing the read only memory for one appropriate to the new designation.

Preferably said means for reading out the information with which the read only memory is programmed includes a timing signal generator which is connected to be triggered, via a time delay circuit, by line blanking pulses, said time delay circuit having a time delay appropriate to the position along a television line at which character or symbol information is required to commence, means being provided for inhibiting the running of said timing signal generator after a number of timing signals therefrom appropriate to the length of the character or symbol information along said television line.

Preferably said timing signal generator is a gated free running bistable circuit arranged to provide timing signals at one picture element interval and the output of said free running bistable circuit is connected to control an addressing counter arrangement for said read only memory via a decade counter whose binary coded decimal output is arranged to be decoded by a decoder whose multiple line outputs are arranged to control the reading out of the information with which said read only memory is programmed into a parallel to serial shift register whose output in video signal form is connected to be mixed with video output signals developed by said television camera and relating to a scene or object being viewed.

Preferably means are provided for counting the number of television lines produced following a field blanking pulse to produce an output signal after a number of television lines appropriate to the height of the character or symbol information in the television picture which output is used to set a bistable circuit which is connected to inhibit running of said timing signal generator when so set and is arranged to be reset upon receipt of the next following field blanking pulse.

One example of television camera arrangement in accordance with the present invention will now be described with reference to the accompanying drawing which is a circuit diagram of a character generator forming part of the camera arrangement. The conventional circuits of the television camera arrangement are not shown since they may be as known per se.

The heart of the character generator consists of a programmable read only memory 1, which consists of a sixteen pin DIP (dual in line package) type MMI 16331. Programmable read only memory 1 is so accommodated in a housing of the camera arrangement that it is readily accessible and inter-changeable with other programmable read only memories programmed to provide different sets of symbols or characters, for example, identifying the camera concerned.

Programmable read only memory 1 is addressed by a counter arrangement consisting of two BCD (binary coded decimal) counters 2 and 3. Counters 2 and 3 are both fourteen pin dual in line packages type SN 7493. The reason for using two counters to address programmable read only memory 1 is that type SN 7493 counters are readily available commercially, but each possess only a 16 bit capacity whereas it is required, in this example of the invention, to provide a 32 bit capacity.

Connected to up-date the counter arrangement 2 and 3 is a divide-by-ten decade counter 4 which derives its input from a dual monostable circuit 5 arranged as a gated free-running bistable providing basic timing at one picture element intervals. Divide-by-10 counter 4 is a fourteen pin D.I.P. type SN 7490, whilst dual monostable circuit 5 is a 16 pin D.I.P. type SN 74123. Dual monostable circuit 5 has a gating control input derived from a terminal 6 to which are applied positive mixed (field and line) blanking signals from the conventional circuits of the camera arrangement. Dual monostable circuit 5 is allowed to run following the back edge of a blanking signal after a delay interval defined by a time constant circuit consisting of capacitor C7 and resistors R8 and R9. This determines the position of the start of the symbols or characters along the TV line. In this particular example, dual monostable circuit 5 is required to run for the duration of four characters i.e. four cycles of divide-by-10 counter 4. A BCD counter 9, a 14 pin D.I.P. type SN 7493, is provided to count a number of cycles (in this example four) of divide-by-10 counter 4 appropriate to the length of the characters or symbols along the television line, whereafter counter 9 is arranged to inhibit further operation of dual monostable circuit 5 until counter 9 is itself reset by the next line blanking pulse. Counter 9 derives its input enabling it to count four cycles of divide-by-10 counter 4 from a decoder 10, a 16 pin D.I.P. type SN 74145, which is connected to decode the BCD output of divide-by-10 counter 4 into 10 line outputs which are connected to control both the programmable read only memory 1 and a serial shift register 11, a 16 pin D.I.P. type SN 74165, which latter derives its signal input from the programmed read only memory 1. The serial output of serial shift register 11 is connected to terminal 12 and provides video information relating to the set of characters or symbols programmed into programmable read only memory 1. The video information appearing on output terminal 12 is mixed with the normal video output of the television camera arrangement derived as a result of viewing a scene.

In order to provide a single block of characters per field a contrrol circuit consisting of a BCD counter 13 and circuits 14, 15 and 16 are provided. Counter 13 is a 14 pin D.I.P. type SN 7493 whilst gate circuits 14, 15 and 16 are each a 14 pin D.I.P. type SN 7400. Gates 15 and 16 are connected to form an RS bistable circuit having an output connected to inhibit dual monostable circuit 5 and one input derived via an amplifier transistor 17, a type BC 109, from the output of counter 13 and a second input derived from a terminal 18 to which negative field blanking pulses from the conventional circuits of the camera are applied. Negative field blanking signals on terminal 18 also connected through a gate 19, again a 14 pin D.I.P. type SN 7400 but arranged to act as an inverter, to initiate counting of counter 13. Counter 13 derives mixed blanking pulse input from terminal 6 via a gate 14. From this input counter 13, when triggered by a negative field blanking pulse from terminal 18 via inverting gate 19, counts the number of lines of picture information being generated. After a number of lines (in this example eight) appropriate to the height of the characters or symbols in the television picture counter 13 provides an output which sets the RS bistable circuit 15, 16 which in turn inhibits the running of dual monostable circuit 5. The inhibiting of dual monostable circuit 5 continues until the RS bistable circuit 15, 16 is reset by the next negative field blanking pulse. Capacitors C6 and C8 are provided to introduce a certain amount of delay into, respectively, the line and field reset circuits in order to bring the characters into the active picture period.

We claim:

1. A television camera arrangement wherein in order to provide in the video signal output thereof character or symbol information, accommodation is provided for a read only memory programmed in accordance with the character or symbol information required, and said camera arrangement includes means synchronised with the video signal timing circuits of the camera, for reading out in video signal form the information with which the read only memory is programmed and means for mixing said last mentioned information with video signal output generated in accordance with a scene being viewed by said camera arrangement, accommodation for said read only memory being provided such that a read only memory is readily removable so that any one of a number of read only memories programmed with different character or symbol information may be accommodated in said camera arrangement.

2. An arrangement as claimed in claim 1 and wherein said means for reading out the information with which the read only memory is programmed includes a timing signal generator which is connected to be triggered, via a time delay circuit, by line blanking pulses, said time delay circuit having a time delay appropriate to the position along a television line at which character or symbol information is required to commence, means being provided for inhibiting the running of said timing signal generator after a number of timing signals there from appropriate to the length of the character or symbol information along said television line.

3. An arrangement as claimed in claim 2 and wherein said timing signal generator is a gated free running bistable circuit arranged to provide timing signals at one picture element interval and the output of said free running bistable circuit is connected to control an addressing counter arrangement for said read only memory via a decade counter whose binary coded decimal output is arranged to be decoded by a decoder whose multiple line outputs are arranged to control the reading out of the information with which said read only memory is programmed into a parallel to serial shift register whose output in video signal from is connected to be mixed with video output signals developed by said television camera and relating to a scene or object being viewed.

4. An arrangement as claimed in claim 2 and wherein means are provided for counting the number of television lines produced following a field blanking pulse to produce an output signal after a number of television lines appropriate to the height of the character or symbol information in the television picture which output is used to set a bistable circuit which is connected to inhibit running of said timing signal generator when so set and is arranged to be reset upon receipt of the next following field blanking pulse.

* * * * *